US011824617B2

(12) United States Patent
Sakhnini et al.

(10) Patent No.: US 11,824,617 B2
(45) Date of Patent: Nov. 21, 2023

(54) UPLINK BEAM MANAGEMENT USING MIXED DOWNLINK AND UPLINK REFERENCE SIGNALS

(71) Applicant: QUALCOMM Incorporated, San Diego, CA (US)

(72) Inventors: Iyab Issam Sakhnini, San Diego, CA (US); Tao Luo, San Diego, CA (US); Wanshi Chen, San Diego, CA (US); Peter Gaal, San Diego, CA (US); Juan Montojo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 17/443,634

(22) Filed: Jul. 27, 2021

(65) Prior Publication Data

US 2022/0060242 A1    Feb. 24, 2022

Related U.S. Application Data

(60) Provisional application No. 62/706,478, filed on Aug. 19, 2020.

(51) Int. Cl.
*H04B 7/08* (2006.01)
*H04W 24/10* (2009.01)
(Continued)

(52) U.S. Cl.
CPC ........... *H04B 7/088* (2013.01); *H04L 5/0051* (2013.01); *H04W 16/28* (2013.01); *H04W 24/10* (2013.01);
(Continued)

(58) Field of Classification Search
CPC ..... H04B 7/088; H04B 7/0695; H04L 5/0051; H04W 16/28; H04W 24/10; H04W 72/1263; H04W 72/23
(Continued)

(56) References Cited

U.S. PATENT DOCUMENTS

2018/0205440 A1    7/2018 Enescu et al.
2019/0109625 A1*   4/2019 Subramanian ....... H04B 7/0628
(Continued)

FOREIGN PATENT DOCUMENTS

CN         108632837 A  * 10/2018  ............ H04W 16/28
WO    WO-2020020453 A1     1/2020

OTHER PUBLICATIONS

International Search Report and Written Opinion—PCT/US2021/071036—ISA/EPO—dated Nov. 8, 2021.

*Primary Examiner* — Rownak Islam
(74) *Attorney, Agent, or Firm* — Arun Swain

(57) ABSTRACT

Various aspects of the present disclosure generally relate to wireless communication. In some aspects, a user equipment (UE) may transmit, to a base station, a report that includes measurements associated with one or more downlink reference signals that are received using a set of candidate downlink beams. The UE may transmit one or more uplink reference signals using a set of candidate uplink beams. The UE may receive, from the base station, information that indicates, among the set of candidate downlink beams and the set of candidate uplink beams, a best uplink beam to use for one or more uplink transmissions. For example, the base station may select the best uplink beam based at least in part on the measurements associated with the one or more downlink reference signals and measurements associated with the one or more uplink reference signals. Numerous other aspects are provided.

26 Claims, 7 Drawing Sheets

(51) Int. Cl.
  *H04W 16/28*    (2009.01)
  *H04W 72/1263*  (2023.01)
  *H04L 5/00*     (2006.01)
  *H04W 72/23*    (2023.01)

(52) U.S. Cl.
  CPC ....... *H04W 72/1263* (2013.01); *H04W 72/23* (2023.01)

(58) Field of Classification Search
  USPC .......................................................... 370/329
  See application file for complete search history.

(56) References Cited

U.S. PATENT DOCUMENTS

2019/0116605 A1   4/2019   Luo et al.
2019/0174527 A1   6/2019   Park et al.

* cited by examiner

continued

UPLINK BEAM MANAGEMENT USING MIXED DOWNLINK AND UPLINK REFERENCE SIGNALS

CROSS-REFERENCE TO RELATED APPLICATION

This Patent Application claims priority to U.S. Provisional Patent Application No. 62/706,478, filed on Aug. 19, 2020, entitled "UPLINK BEAM MANAGEMENT USING MIXED DOWNLINK AND UPLINK REFERENCE SIGNALS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink beam management using mixed downlink and uplink reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: transmitting, to a base station, a report that includes measurements associated with one or more downlink reference signals, wherein the one or more downlink reference signals are received using a set of candidate downlink beams; transmitting one or more uplink reference signals, wherein the one or more uplink reference signals are transmitted using a set of candidate uplink beams; and receiving, from the base station, information that indicates, among the set of candidate downlink beams and the set of candidate uplink beams, a best uplink beam to use for one or more uplink transmissions based at least in part on the measurements associated with the one or more downlink reference signals and measurements associated with the one or more uplink reference signals.

In some aspects, a method of wireless communication performed by a base station includes: receiving, from a UE, a report that includes measurements associated with one or more downlink reference signals that are received by the UE using a set of candidate downlink beams; determining measurements associated with one or more uplink reference signals that are transmitted by the UE using a set of candidate uplink beams; and transmitting, to the UE, information that indicates, among the set of candidate downlink beams and the set of candidate uplink beams, a best uplink beam to use for one or more uplink transmissions based at least in part on the measurements associated with the one or more downlink reference signals and the measurements associated with the one or more uplink reference signals.

In some aspects, a UE for wireless communication includes a memory and one or more processors coupled to the memory, the memory and the one or more processors configured to: transmit, to a base station, a report that includes measurements associated with one or more downlink reference signals, wherein the one or more downlink reference signals are received using a set of candidate downlink beams; transmit one or more uplink reference signals, wherein the one or more uplink reference signals are transmitted using a set of candidate uplink beams; and receive, from the base station, information that indicates, among the set of candidate downlink beams and the set of candidate uplink beams, a best uplink beam to use for one or more uplink transmissions based at least in part on the measurements associated with the one or more downlink reference signals and measurements associated with the one or more uplink reference signals.

In some aspects, a base station for wireless communication includes a memory and one or more processors coupled to the memory, the memory and the one or more processors configured to: receive, from a UE, a report that includes measurements associated with one or more downlink reference signals that are received by the UE using a set of candidate downlink beams; determine measurements associated with one or more uplink reference signals that are transmitted by the UE using a set of candidate uplink beams; and transmit, to the UE, information that indicates, among the set of candidate downlink beams and the set of candidate uplink beams, a best uplink beam to use for one or more uplink transmissions based at least in part on the measurements associated with the one or more downlink reference signals and the measurements associated with the one or more uplink reference signals.

In some aspects, a non-transitory computer-readable medium storing a set of instructions for wireless communication includes one or more instructions that, when executed by one or more processors of a UE, cause the UE to: transmit, to a base station, a report that includes measurements associated with one or more downlink reference signals, wherein the one or more downlink reference signals are received using a set of candidate downlink beams; transmit one or more uplink reference signals, wherein the one or more uplink reference signals are transmitted using a set of candidate uplink beams; and receive, from the base station, information that indicates, among the set of candidate downlink beams and the set of candidate uplink beams, a best uplink beam to use for one or more uplink transmissions based at least in part on the measurements associated with the one or more downlink reference signals and measurements associated with the one or more uplink reference signals.

In some aspects, a non-transitory computer-readable medium storing a set of instructions for wireless communication includes one or more instructions that, when executed by one or more processors of a base station, cause the base station to: receive, from a UE, a report that includes measurements associated with one or more downlink reference signals that are received by the UE using a set of candidate downlink beams; determine measurements associated with one or more uplink reference signals that are transmitted by the UE using a set of candidate uplink beams; and transmit, to the UE, information that indicates, among the set of candidate downlink beams and the set of candidate uplink beams, a best uplink beam to use for one or more uplink transmissions based at least in part on the measurements associated with the one or more downlink reference signals and the measurements associated with the one or more uplink reference signals.

In some aspects, an apparatus for wireless communication includes: means for transmitting, to a base station, a report that includes measurements associated with one or more downlink reference signals, wherein the one or more downlink reference signals are received using a set of candidate downlink beams; means for transmitting one or more uplink reference signals, wherein the one or more uplink reference signals are transmitted using a set of candidate uplink beams; and means for receiving, from the base station, information that indicates, among the set of candidate downlink beams and the set of candidate uplink beams, a best uplink beam to use for one or more uplink transmissions based at least in part on the measurements associated with the one or more downlink reference signals and measurements associated with the one or more uplink reference signals.

In some aspects, an apparatus for wireless communication includes: means for receiving, from a UE, a report that includes measurements associated with one or more downlink reference signals that are received by the UE using a set of candidate downlink beams; means for determining measurements associated with one or more uplink reference signals that are transmitted by the UE using a set of candidate uplink beams; and means for transmitting, to the UE, information that indicates, among the set of candidate downlink beams and the set of candidate uplink beams, a best uplink beam to use for one or more uplink transmissions based at least in part on the measurements associated with the one or more downlink reference signals and the measurements associated with the one or more uplink reference signals.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
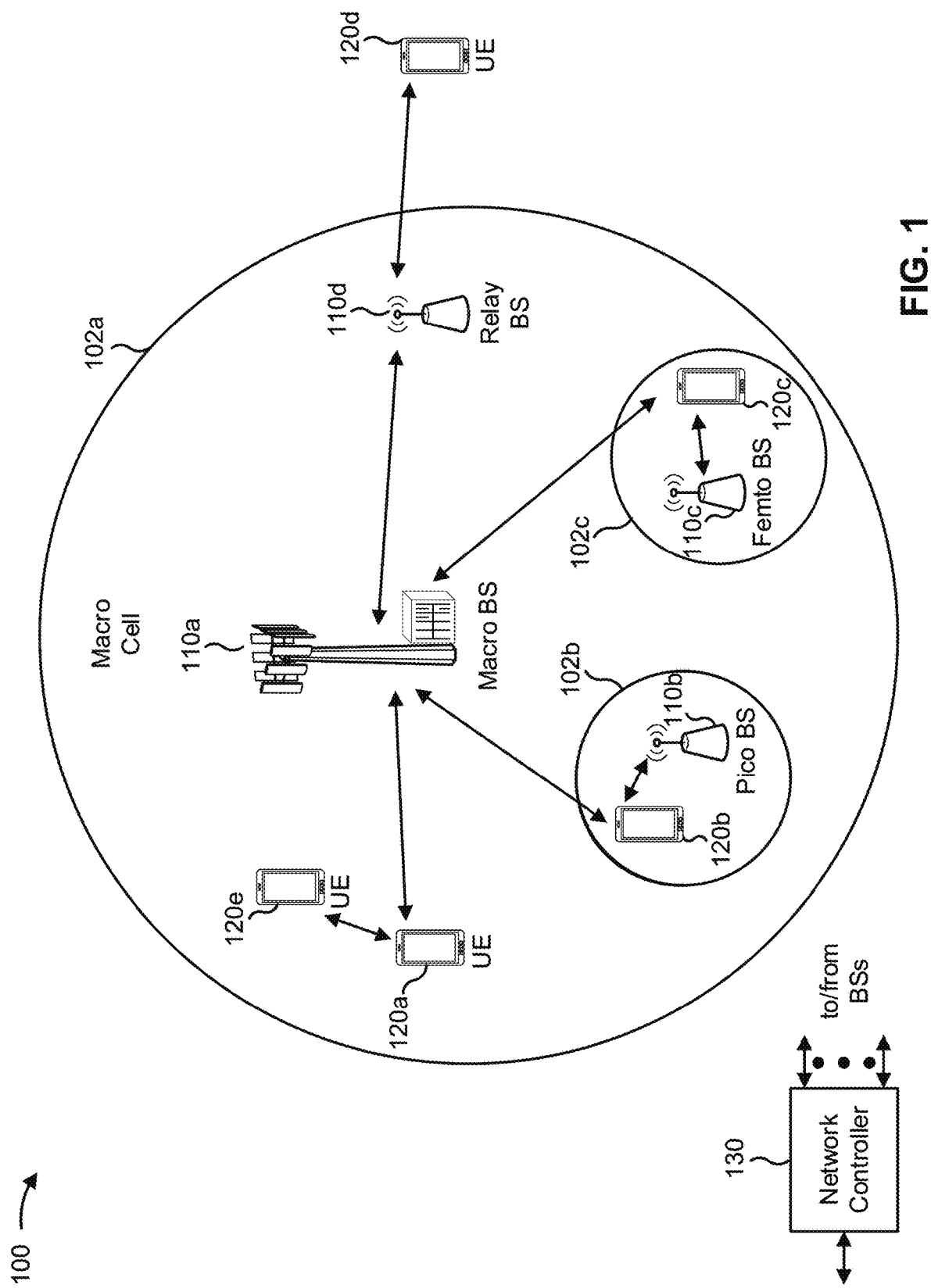
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
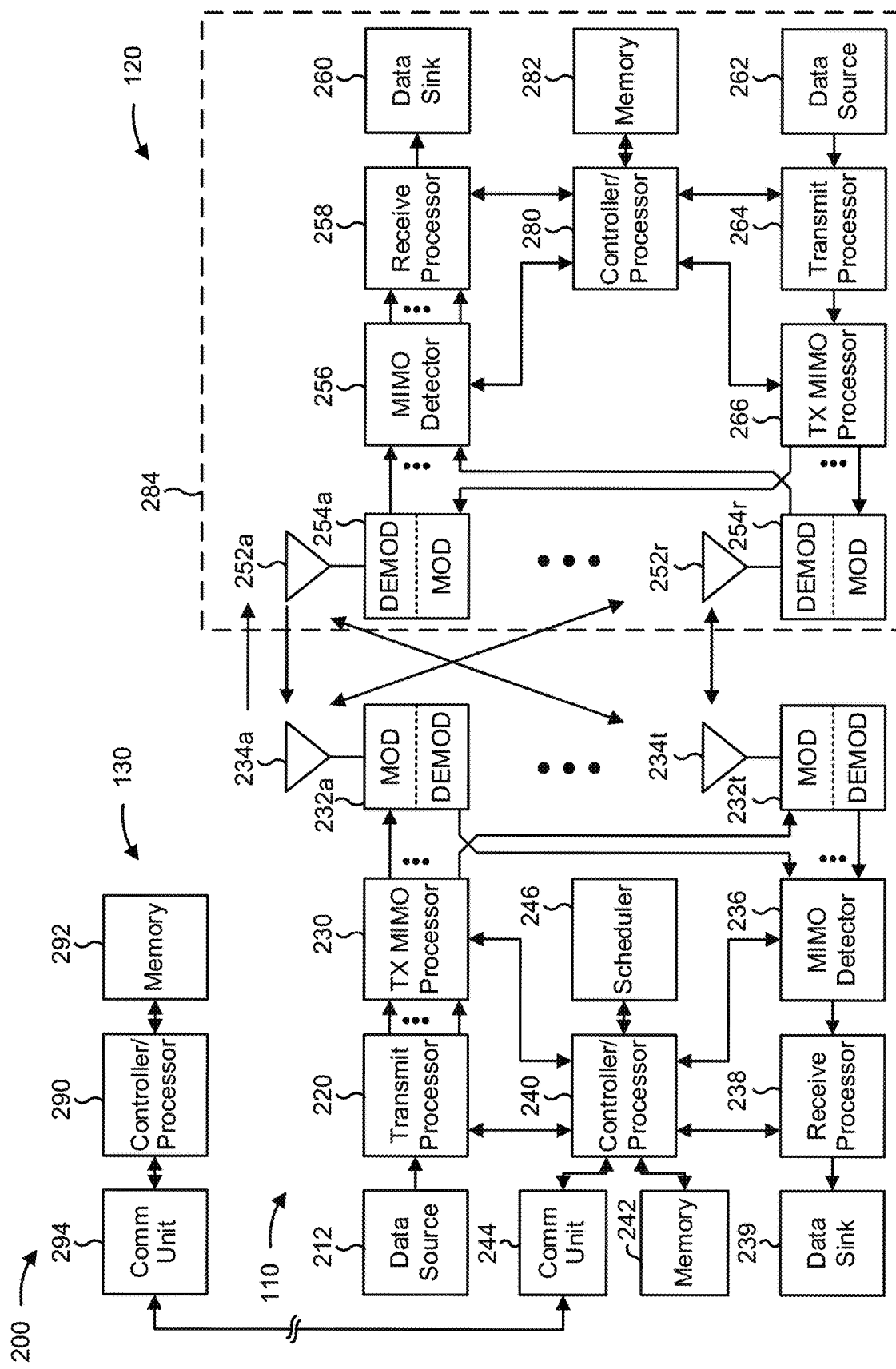
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-7).

Controller/processor 240 of base station 110, controller/processor 280 of UE 120, and/or any other component(s) of FIG. 2 may perform one or more techniques associated with uplink beam management using mixed downlink and uplink reference signals, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for transmitting, to base station 110, a report that includes measurements associated with one or more downlink reference signals received using a set of candidate downlink beams, means for transmitting one or more uplink reference signals using a set of candidate uplink beams, means for receiving, from base station 110, information that indicates, among the set of candidate downlink beams and the set of candidate uplink beams, a best uplink beam to use for one or more uplink transmissions based at least in part on the measurements associated with the one or more downlink reference signals and measurements associated with the one or more uplink reference signals, and/or the like. Additionally, or alternatively, UE 120 may include means for performing aspects of any of the methods described herein, for example, as described with reference to FIGS. 5-7. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from UE 120, a report that includes measurements associated with one or more downlink reference signals that are received by UE 120 using a set of candidate downlink beams, means for determining measurements associated with one or more uplink reference signals that are transmitted by UE 120 using a set of candidate uplink beams, means for transmitting, to UE 120, information that indicates, among the set of candidate downlink beams and the set of candidate uplink beams, a best uplink beam to use for one or more uplink transmissions based at least in part on the measurements associated with the one or more downlink reference signals and the measurements associated with the one or more uplink reference signals, and/or the like. Additionally, or alternatively, base station 110 may include means for performing aspects of any of the methods described herein, for example, as described with reference to FIGS. 5-7. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
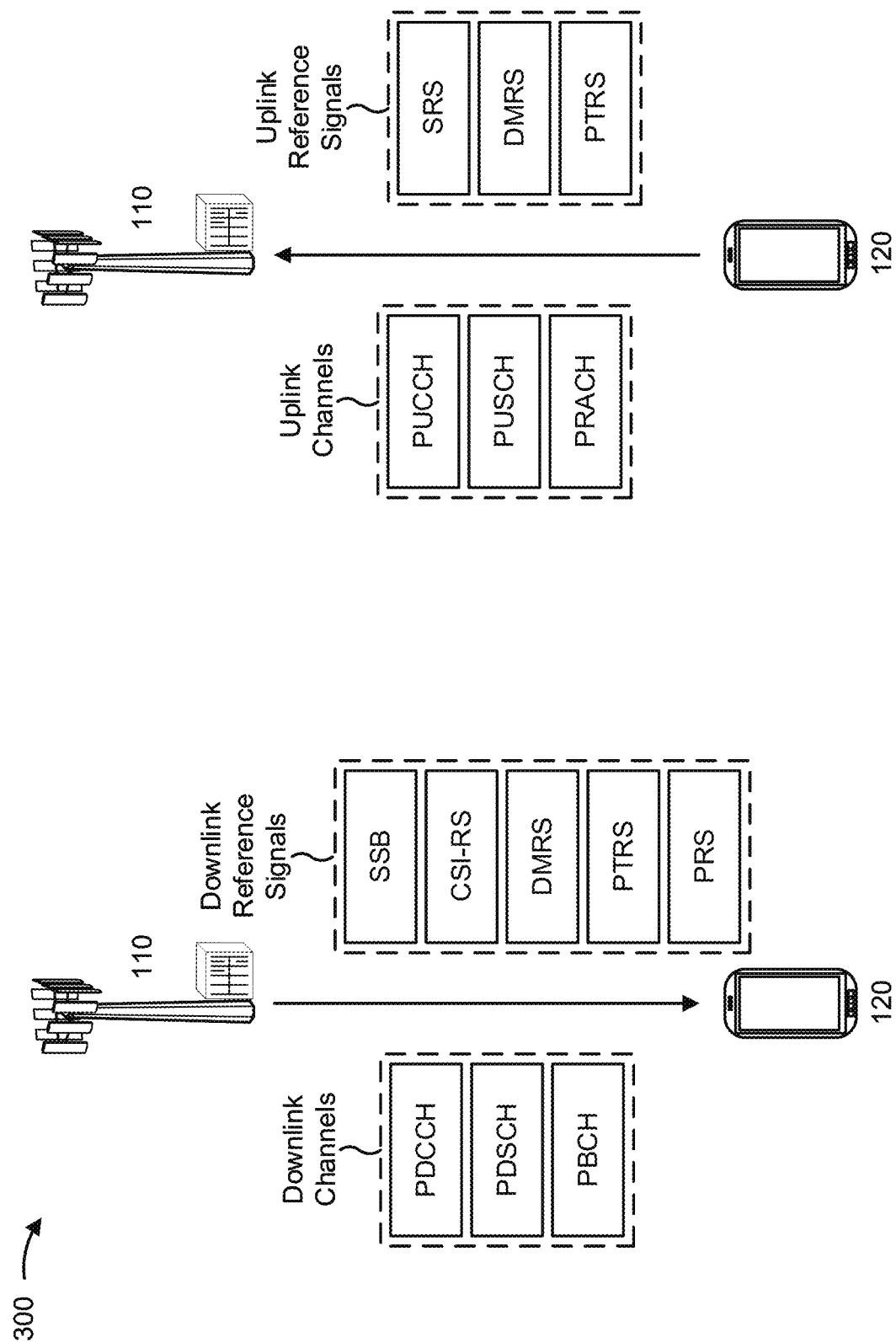
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection, beam management, and/or the like.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to the physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve hearability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
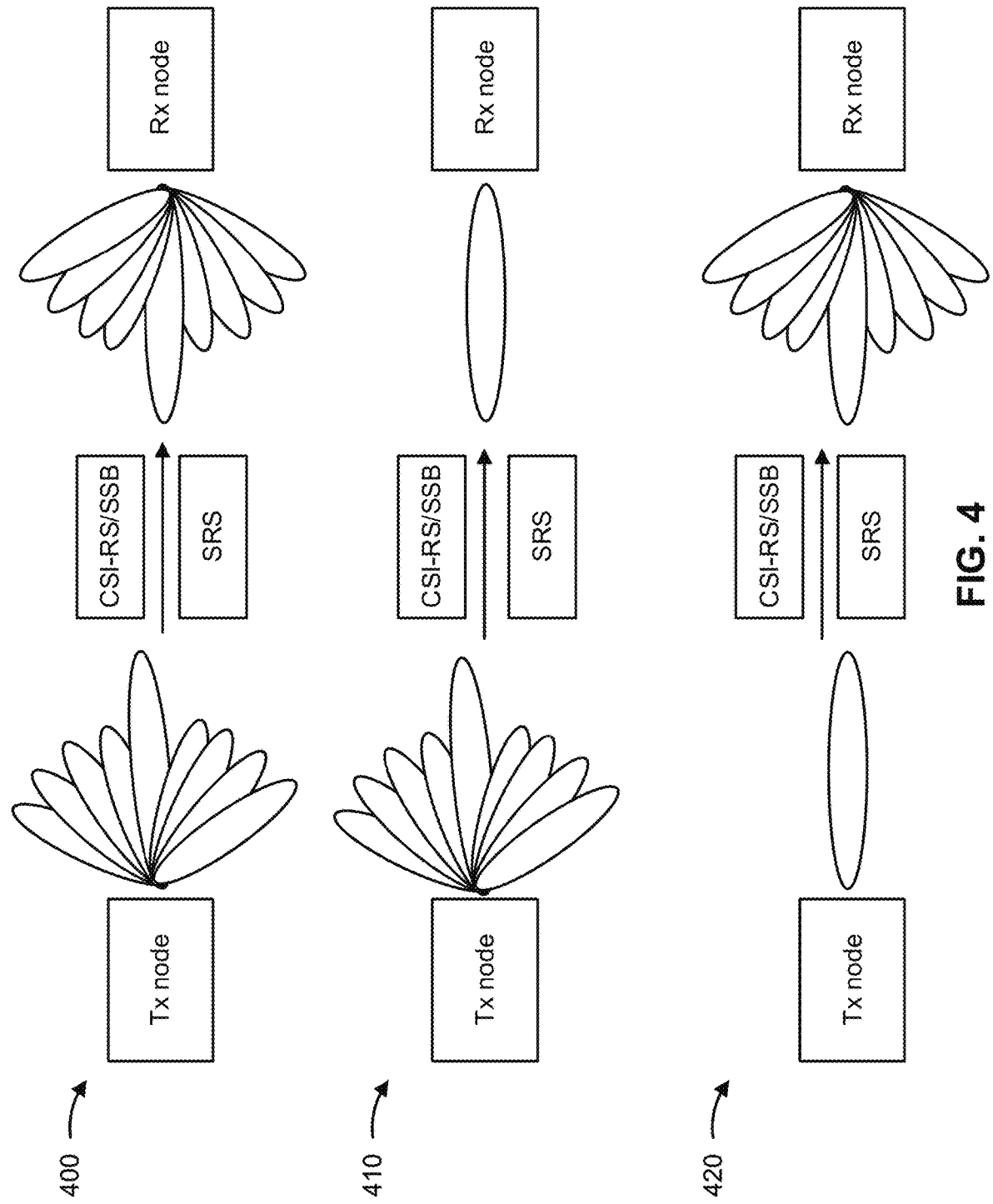
FIG. 4 is a diagram illustrating examples of beam management procedures, in accordance with the present disclosure.

FIG. 4 is a diagram illustrating examples 400, 410, and 420 of beam management procedures, in accordance with the present disclosure.

As shown in FIG. 4, examples 400, 410, and 420 include a transmit (Tx) node in communication with a receive (Rx) node in a wireless network (e.g., wireless network 100). For example, in some aspects, the Tx node may be a base station 110 and the Rx node may be a UE 120, which may perform one or more beam management procedures to select a downlink transmit beam and a corresponding downlink receive beam to be used for beamformed downlink communication from the base station 110 to the UE 120 based at least in part on one or more downlink reference signal transmissions (e.g., CSI-RS transmissions and/or SSB transmissions). Additionally, or alternatively, the Tx node may be a UE 120 and the Rx node may be a base station 110, which may perform one or more beam management procedures to select an uplink transmit beam and a corresponding uplink receive beam to be used for beamformed uplink communication from the UE 120 to the base station 110 based at least in part on one or more uplink reference signal transmissions (e.g., SRS transmissions).

However, the devices shown in FIG. 4 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, and/or the like). In some aspects, the Tx node and the Rx node may be in a connected state (e.g., a radio resource control (RRC) connected state).

As shown in FIG. 4, example 400 may include a Tx node and an Rx node communicating to perform beam management using reference signals (e.g., CSI-RSs or SSBs when the beam management is to configure downlink beams, or SRSs when the beam management is to configure uplink beams). Example 400 depicts a first beam management procedure (e.g., P1 beam management in which beam sweeping is performed at the Tx node and the Rx node). The first beam management procedure may be referred to as a beam selection procedure, an initial beam acquisition procedure, a beam sweeping procedure, a cell search procedure, a beam search procedure, and/or the like. As shown in FIG. 4 and example 400, a set of one or more reference signals may be configured to be transmitted from the Tx node to the Rx node. The reference signals may be configured to be periodic (e.g., using RRC signaling and/or the like), semi-persistent (e.g., using media access control (MAC) control element (MAC-CE) signaling and/or the like), and/or aperiodic (e.g., using DCI and/or the like).

The first beam management procedure may include the Tx node performing beam sweeping over multiple transmit (Tx) beams. The Tx node may transmit a reference signal using each transmit beam for beam management. To enable the Rx node to perform Rx beam sweeping, the Tx node may use a transmit beam to transmit (e.g., with repetitions) each reference signal at multiple times within the same reference signal resource set so that the Rx node can sweep through receive beams in multiple transmission instances. For example, if the Tx node has a set of N transmit beams and the Rx node has a set of M receive beams, the Tx node may transmit the reference signals on each of the N transmit beams M times so that the Rx node may receive M instances of the reference signal per transmit beam. In other words, for each transmit beam of the Tx node, the Rx node may perform beam sweeping through the receive beams of the Rx node. As a result, the first beam management procedure may enable the Rx node to measure a reference signal on different transmit beams using different receive beams to support selection of Tx node transmit beams/Rx node receive beam(s) beam pair(s). To configure downlink beams, the Rx node (e.g., a UE 120) may report the measurements to the Tx node (e.g., a base station 110) to enable the Tx node to select one or more beam pair(s) for downlink communication between the Tx node and the Rx node. Additionally, or alternatively, to configure uplink beams, the Rx node (e.g., a base station 110) may obtain the measurements and select one or more beam pair(s) for uplink communication between the Tx node and the Rx node.

As shown in FIG. 4, example 410 may include a Tx node and a Rx node communicating to perform beam management using reference signals. Example 410 depicts a second beam management procedure (e.g., P2 beam management in which beam sweeping is performed at the Tx node only). The second beam management procedure may be referred to as a beam refinement procedure, a transmit beam refinement procedure, and/or the like. As shown in FIG. 4 and example 410, a set of one or more reference signals may be configured to be transmitted from the Tx node to the Rx node. The reference signals may be configured to be aperiodic (e.g., using DCI and/or the like). The second beam management procedure may include the Tx node performing beam sweeping over one or more transmit beams. The one or more transmit beams may be a subset of all transmit beams associated with the Tx node (e.g., determined based at least in part on measurements reported by the Rx node, feedback from the Rx node, and/or the like in connection with the first beam management procedure). The Tx node may transmit a reference signal using each transmit beam of the one or more transmit beams for beam management. The Rx node may measure each reference signal using a single (e.g., a same) receive beam (e.g., determined based at least in part on measurements performed in connection with the first beam management procedure). The second beam management procedure may enable the Tx node to select a best transmit beam based at least in part on measurements of the reference signals (e.g., measured by the Rx node using the single receive beam and reported by the Rx node, measured by the Tx node, and/or the like).

As shown in FIG. 4, example 420 depicts a third beam management procedure (e.g., P3 beam management in which beam sweeping is performed at the Rx node only). The third beam management procedure may be referred to as a beam refinement procedure, a receive beam refinement procedure, and/or the like. As shown in FIG. 4 and example 420, a set of one or more reference signals may be configured to be transmitted from the Tx node to the Rx node. The reference signals may be configured to be aperiodic (e.g., using DCI and/or the like). The third beam management process may include the Tx node transmitting the one or more reference signals using a single transmit beam (e.g., determined based at least in part on measurements performed in connection with the first beam management procedure and/or the second beam management procedure). To enable the Rx node to perform receive beam sweeping, the Tx node may use a transmit beam to transmit (e.g., with repetitions) reference signals at multiple times within the same reference signal resource set, so that the Rx node can sweep through one or more receive beams in multiple transmission instances. The one or more receive beams may be a subset of all receive beams associated with the Rx node (e.g., determined based at least in part on measurements performed in connection with the first beam management procedure and/or the second beam management procedure). The third beam management procedure may enable the Tx node and/or the Rx node to select a best receive beam based at least in part on reported measurements received from the Rx node (e.g., measurements of the reference signal associated with the transmit beam using the one or more receive beams).

As indicated above, FIG. 4 is provided as an example of beam management procedures. Other examples of beam management procedures may differ from what is described with respect to FIG. 4. For example, the Rx node and the Tx node may perform the third beam management procedure before performing the second beam management procedure, the Rx node and the Tx node may perform a similar beam management procedure to select sidelink beams, and/or the like.

In a wireless network, a base station may serve different UEs of different categories, different UEs that support different capabilities, and/or the like. For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capability (RedCap) UE, a low tier UE, and/or an NR-Lite UE, among other examples. A UE of the first category may be, for example, an MTC UE, an eMTC UE, and/or an IoT UE. A UE of the second category may have an advanced feature set compared to UEs of the second category, and may be referred to as a baseline UE, a high tier UE, an NR UE, and/or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

For example, UEs of the first category may support a lower maximum MCS than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Additionally, or alternatively, UEs of the second category may be capable of communicating using a shortened transmission time interval (TTI) (e.g., a slot length of 1 ms or less, 0.5 ms, 0.25 ms, 0.125 ms, 0.0625 ms, and/or the like, depending on a sub-carrier spacing), and UEs of the first category may not be capable of communicating using the shortened TTI.

Accordingly, one consideration in deploying a wireless network is to compensate for different UE capabilities. For example, a base station that serves UEs having different capabilities may implement functionality to mitigate or limit performance degradation (e.g., potential coverage reduction, resource consumption, and/or the like) that may result from a UE having a reduced capability, to flexibly utilize downlink and uplink resources when serving UEs in different categories, and/or the like. For example, as described above, uplink beam management is typically performed using repeated SRS transmissions, which may be resource-intensive for a UE, especially for RedCap UEs that may have limited transmission resources relative to other UEs. Furthermore, performing uplink beam management using SRS transmissions only increases resource overhead, because the base station needs to configure multiple and/or frequent SRS resource sets. In addition, a base station may serve certain UEs that are associated with uplink heavy traffic applications (e.g., RedCap UEs), which are time multiplexed, frequency multiplexed, and/or spatially multiplexed with other UEs that may be associated with more downlink heavy traffic applications. Accordingly, a base station may need to flexibly allocate more resources to uplink communication or to downlink communication at different times to accommodate different UEs. In cases where the base station increases the resources allocated to downlink communication, uplink transmission opportunities may be reduced, which may reduce uplink beam refinement capabilities at a UE (e.g., due to having fewer transmission opportunities).

Some aspects described herein relate to techniques and apparatuses to perform uplink beam management using a mixture of downlink and uplink reference signals. For example, in some aspects, a base station may transmit a downlink signal to a UE to trigger an uplink beam management procedure that includes transmissions of one or more downlink reference signals by the base station and one or more uplink reference signals by the UE. In this way, the base station may have flexibility to configure uplink beam management using the mixture of downlink and uplink reference signals (e.g., by allocating more uplink resources at certain times to accommodate uplink heavy traffic, by allocating more downlink resources at other times to accommodate downlink heavy traffic, and/or the like). Furthermore, in cases where uplink beam quality can be determined from an associated downlink reference signal (e.g., SSB or CSI-RS) measurement that uses the same spatial filter as an uplink beam, the mixture of downlink and uplink reference signals can be used to perform uplink beam management while maintaining a beam refinement capability for the UE (e.g., in cases where downlink and uplink beam correspondence can be assumed due to channel reciprocity in wireless networks that use time division duplexing (TDD), where downlink and uplink transmission channels match exactly). Furthermore, performing uplink beam management using one or more downlink reference signals may conserve UE resources because transmitting generally consumes more resources (e.g., power) than receiving.

Additionally, in some aspects, the downlink reference signals and/or the uplink reference signals that are used in the uplink beam management procedure may include one or more (downlink and/or uplink) DMRSs. In this way, resource overhead may be reduced relative to beam management procedures that use SSBs and/or CSI-RSs only on a downlink, and/or beam management procedures that use SRSs only on an uplink. For example, downlink DMRSs may be configured to enable a UE to estimate a radio channel to demodulate an associated downlink channel (e.g., a PBCH, PDCCH, and/or PDSCH), and uplink DMRSs may be configured to enable a base station to estimate a radio channel to demodulate an associated uplink channel (e.g., a PUCCH and/or PUSCH). In this way, including one or more downlink and/or uplink DMRSs in the mixture of downlink and/or uplink reference signals that are used to perform the uplink beam management may reduce resource overhead, simplify scheduling, and/or the like.

Figure 5:
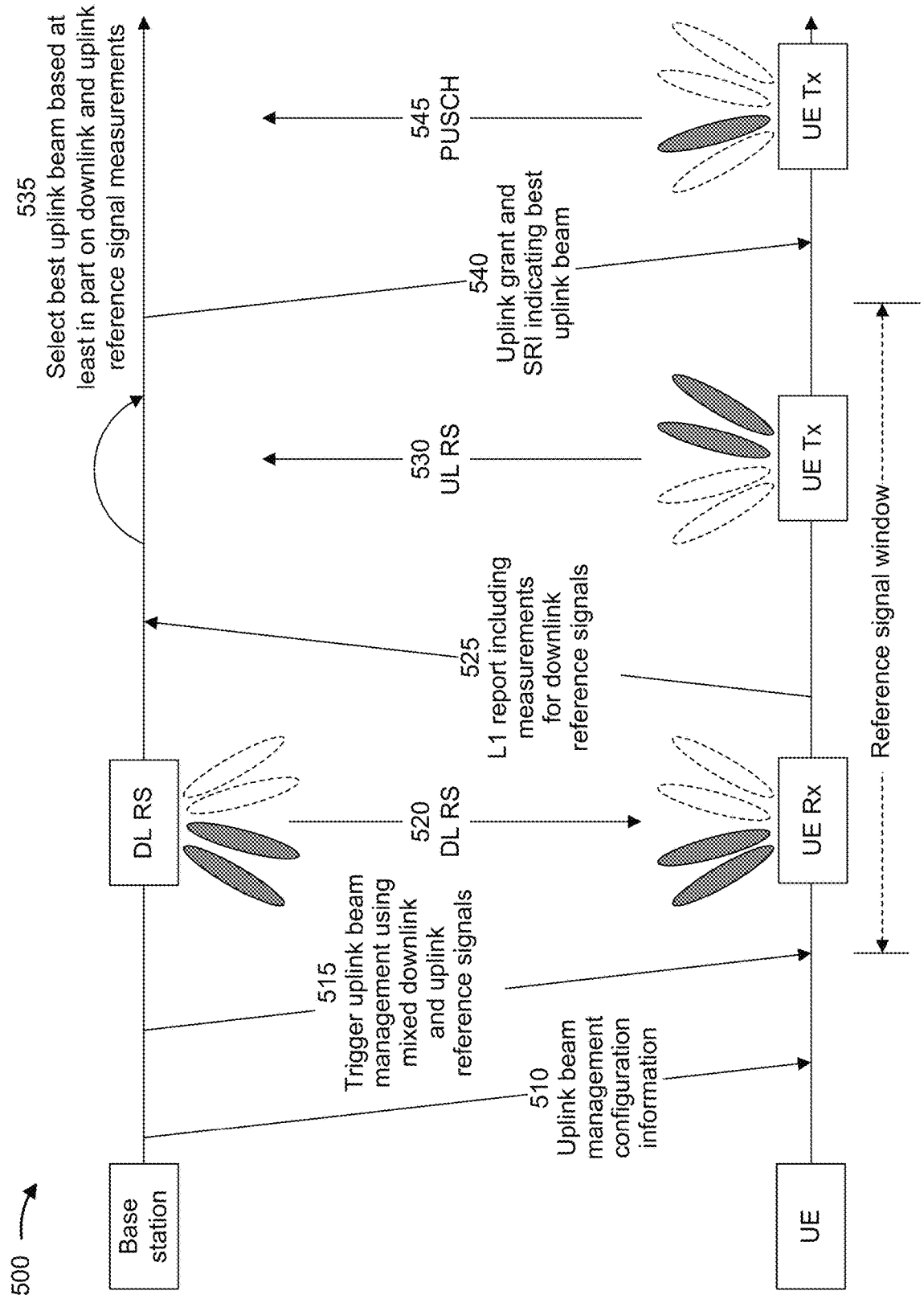
FIG. 5 is a diagram illustrating an example associated with uplink beam management using mixed downlink and uplink reference signals, in accordance with the present disclosure.

FIG. 5 is a diagram illustrating an example 500 associated with uplink beam management using mixed downlink and uplink reference signals, in accordance with the present disclosure. As shown in FIG. 5, example 500 includes a base station (e.g., base station 110 and/or the like) in communication with a UE (e.g., UE 120) in a wireless network (e.g., wireless network 100 and/or the like). In some aspects, the base station and the UE may communicate on a wireless access link, which may include an uplink and a downlink.

In some aspects, as described in further detail herein, the base station may transmit a downlink signal (e.g., a downlink control information (DCI) message) to the UE to trigger an uplink beam management procedure that includes transmissions of one or more downlink reference signals by the base station and transmissions of one or more uplink reference signals by the UE. The base station may transmit the one or more downlink reference signals using one or more downlink transmit beams, and the UE may receive the one or more downlink reference signals using one or more downlink receive beams. Accordingly, the UE may measure the one or more downlink reference signals and transmit, to the base station, a measurement report (e.g., a Layer 1 (L1) report) that includes measurements associated with the one or more downlink reference signals that are received using the one or more downlink receive beams. The UE may further transmit one or more uplink reference signals using one or more uplink transmit beams, and the base station may measure the one or more uplink reference signals. Accordingly, the base station may determine a best uplink beam to be used by the UE based at least in part on the measurements reported by the UE for the one or more downlink reference signals and the measurements obtained by the base station for the one or more uplink reference signals. The base station may then transmit, to the UE, information indicating the best uplink beam, which the UE may then use for one or more subsequent uplink transmissions. For example, the base station may transmit the information indicating the best uplink beam in a downlink message that contains an uplink grant scheduling one or more uplink transmissions (e.g., a PUSCH), and the UE may use the best uplink beam indicated in the uplink grant to transmit the PUSCH.

As shown in FIG. 5, and by reference number 510, the base station may transmit, and the UE may receive, uplink beam management configuration information. For example, in some aspects, the uplink beam management configuration information may be provided in one or more downlink signaling messages, such as an RRC message, a MAC-CE, a DCI message, and/or the like. In some aspects, the uplink beam management configuration information may indicate or otherwise configure a mixture of one or more downlink reference signals and one or more uplink reference signals to be used when the base station and the UE perform an uplink beam management procedure (e.g., for initial uplink beam selection, uplink beam refinement, and/or the like). In some aspects, the one or more downlink reference signals to be used when the base station and the UE perform the uplink beam management procedure may include one or more SSBs, one or more CSI-RSs, and/or one or more downlink DMRSs (e.g., a PDCCH DMRS, a PDSCH DMRS, and/or the like). Additionally, or alternatively, the one or more uplink reference signals to be used when the base station and the UE perform the uplink beam management procedure may include one or more SRSs and/or one or more uplink DMRSs (e.g., a PUCCH DMRS, a PUSCH DMRS, and/or the like).

In some aspects, the uplink beam management configuration information may further indicate or otherwise configure a set of reference signal resources to be included in the uplink beam management procedure. For example, in some aspects, the reference signal resources to be included in the uplink beam management procedure may be window-based. In this case, the downlink and uplink reference signals to be included in the uplink beam management procedure may include all downlink reference signals and all uplink reference signals that are scheduled to be transmitted within a time window prior to or after a particular downlink message (e.g., a downlink message that triggers the uplink beam management procedure, a downlink message that includes an uplink grant scheduling an uplink transmission using an uplink beam that is selected during the uplink beam management procedure, and/or the like). Additionally, or alternatively, the reference signal resources to be included in the uplink beam management procedure may be explicitly indicated in the uplink beam management configuration information (e.g., in one or more RRC messages, MAC-CE messages, and/or DCI messages).

In some aspects, the uplink beam management configuration information may further indicate or otherwise configure (e.g., in one or more RRC messages, MAC-CE messages, and/or DCI messages) indicator indexing information to associate each candidate downlink beam that the UE is to use to receive a downlink reference signal with a corresponding indicator, and to associate each candidate uplink beam that the UE is to use to transmit an uplink reference signal with a corresponding indicator. For example, the indicator indexing information may assign an indicator, such as an SRS resource indicator (SRI) index, to each downlink beam that the UE is to use to receive an SSB, a CSI-RS, a PDCCH DMRS, and/or a PDSCH DMRS transmitted by the base station during the uplink beam management procedure. In a similar respect, the indicator indexing information may assign an SRI index or another suitable indicator to each uplink beam that the UE is to use to transmit an SRS, a PUCCH DMRS, and/or a PUSCH DMRS to the base station during the uplink beam management procedure.

In this way, the indicator indexing information may indicate a mapping among a set of indicators (e.g., SRI indexes and/or the like), a set of candidate downlink beams to be used by the UE to receive one or more downlink reference signals, and a set of candidate uplink beams to be used by the UE to transmit one or more uplink reference signals. For example, an SRI typically points to or otherwise identifies a particular SRS beam (e.g., an uplink beam used to transmit an SRS), whereby SRI indexing information is typically used to index uplink beams only. Accordingly, in some aspects, the indicator indexing information may be overloaded or extended to map SRI indexes (or other indicators) to candidate downlink beams that may be used to receive an SSB, a CSI-RS, a PDCCH DMRS, and/or a PDSCH DMRS and to candidate uplink beams that may be used to transmit an SRS, a PUCCH DMRS, and/or a PUSCH DMRS. In this way, the base station may subsequently indicate a best uplink beam according to an SRI index that maps to any suitable candidate downlink beam and/or candidate uplink beam.

As further shown in FIG. 5, and by reference number 515, the base station may transmit, and the UE may receive, a downlink communication to trigger the uplink beam management process using mixed downlink and uplink reference signals. For example, in some aspects, the downlink communication may be a single DCI message to trigger an uplink beam management process that generally includes transmissions of a set of one or more downlink reference signals from the base station to the UE and a set of one or more uplink reference signals from the UE to the base station. Furthermore, in cases where the uplink beam management procedure is configured to be window-based, the DCI message triggering the uplink beam management process may trigger a reference signal window, whereby all downlink and uplink reference signals that are scheduled within a certain time after the DCI message triggering the uplink beam management procedure are to be included in the uplink beam management process. Additionally, or alternatively, the reference signal window may cover all downlink and uplink reference signals that are scheduled within a certain time prior to a grant message or another suitable message. Alternatively, in cases where the downlink and uplink reference signals to be included in the uplink beam management process are explicitly indicated, the UE may determine the downlink and uplink reference signals to be included in the uplink beam management process based at least in part on the initial uplink beam management configuration information, one or more indicators in the DCI message triggering the uplink beam management procedure, and/or the like.

In some aspects, in addition to configuring the downlink and uplink reference signals to be used in the uplink beam management procedure (e.g., by an explicit indicator, a window-based trigger, and/or the like), the single DCI message may configure one or more switching gaps between downlink and uplink reference signals. For example, in a TDD communication system, a guard time or guard interval is generally provided between downlink reception and uplink transmission (and vice versa) in order to allow a signal traveling from a transmitter to arrive at a receiver before a transmission is started in the other direction. Accordingly, because the uplink beam management procedure includes transmissions of downlink and uplink reference signals, the DCI message triggering the uplink beam management procedure may configure switching gaps (e.g., guard times, guard intervals, and/or the like) between the transmissions of a set of downlink reference signals and a set of uplink reference signals.

In some aspects, in cases where the mixture of downlink and uplink reference signals to be included in the uplink beam management procedure includes one or more DMRSs, a timing relationship (e.g., a downlink-to-uplink or uplink-to-downlink switching time or switching gap) may be defined for the DMRS. For example, in some aspects, the timing relationship between a downlink DMRS and an uplink reference signal (e.g., an SRS or uplink DMRS) and/or a downlink reference signal (e.g., an SSB, CSI-RS, or downlink DMRS) and an uplink DMRS may be indicated in the DCI message triggering the uplink beam management procedure, the uplink beam management configuration information, a wireless communication standard or specification, and/or the like. For example, there may be multiple DMRSs transmitted at different times during the uplink beam management procedure (e.g., DMRSs associated with multiple PDCCHs, PDSCHs, PUCCHs, PUSCHs, and/or the like). Accordingly, the timing relationship between the downlink DMRSs and the uplink reference signals, and/or the downlink reference signals and the uplink DMRSs, may indicate which downlink and/or uplink DMRSs are to be used for uplink beam management (e.g., a first DMRS, a last DMRS, and/or the like).

Furthermore, in some aspects, the single DCI message may configure an L1 measurement report that the UE is to provide for the downlink reference signals that are transmitted by the base station in the uplink beam management procedure. For example, in some aspects, the L1 measurement report may be configured according to CSI report settings that define the content, timing, and/or other parameters of the L1 measurement report (e.g., parameters to be used to measure the downlink reference signal(s), resources to be used to transmit the L1 measurement report, and/or the like).

As further shown in FIG. 5, and by reference number 520, the base station may transmit one or more downlink reference signals using a set of candidate downlink transmit beams, and the UE may receive the downlink reference signals using a set of candidate downlink receive beams. For example, as described above, the downlink reference signals may include one or more SSBs, one or more CSI-RSs, one or more DMRSs, and/or the like, which may be transmitted by the same TRP, different TRPs that have a common physical cell identity (PCI), different TRPs that have different PCIs, and/or the like. Additionally, or alternatively, the downlink reference signals may be transmitted via a particular component carrier, or via different component carriers. In some aspects, the UE may obtain measurements associated with the downlink reference signals received via the set of candidate downlink beams (e.g., an RSRP measurement), whereby the measurements associated with the downlink reference signals may indicate a quality associated with a corresponding downlink beam. Furthermore, based at least in part on channel reciprocity, a measurement associated with a downlink reference signal received via a particular candidate downlink beam may indicate the quality of a candidate uplink beam that uses the same spatial filter.

As further shown in FIG. 5, and by reference number 525, the UE may transmit, to the base station, an L1 measurement report that includes measurements associated with the downlink reference signals received via the candidate downlink receive beams associated with the UE. For example, in some aspects, the UE may determine the measurements included in the L1 measurement report based at least in part on one or more CSI report settings included in the DCI message triggering the uplink beam management procedure, may transmit the L1 measurement report using a resource indicated in the DCI message triggering the uplink beam management procedure, and/or the like. Furthermore, as described above, each candidate downlink beam associated with the UE may be mapped to a particular SRI index, which may be associated with the downlink reference signal measurements included in the L1 measurement report. In this way, the base station may determine respective qualities associated with each downlink receive beam (and therefore the corresponding uplink beam that uses the same or a similar spatial filter) based at least in part on the SRI indexes associated with the downlink reference signal measurements.

As further shown in FIG. 5, and by reference number 530, the UE may transmit one or more uplink reference signals using a set of candidate uplink transmit beams, and the base station may receive the uplink reference signals using a set of candidate uplink receive beams. For example, as described above, the uplink reference signals may include one or more SRSs, one or more DMRSs, and/or the like, which may be transmitted by the same TRP, by different TRPs that have a common PCI, by different TRPs that have different PCIs, using the same component carrier, using different component carriers, and/or the like. Furthermore, the downlink reference signals and the uplink reference signals may be associated with (e.g., transmitted by and transmitted to) a common TRP, different TRPs that have a common PCI, different TRPs that have different PCIs, different component carriers, and/or the like. In some aspects, the candidate uplink beams used to transmit the uplink reference signals may be associated with different spatial filters (e.g., beam directions) than the candidate downlink beams used to receive the downlink reference signals (e.g., the candidate downlink beams and the candidate uplink beams may be non-overlapping). Alternatively, in some cases, one or more of the downlink and uplink reference signals may overlap (e.g., at least one beam may be included in both the set of candidate downlink beams and the set of candidate uplink beams). In this case, the base station may use a delta between a measurement obtained and reported by the UE for a downlink reference signal, and a measurement obtained by the base station for an overlapping uplink reference signal, to determine an uncertainty associated with the measurements reported by the UE.

As further shown in FIG. 5, and by reference number 535, the base station may select a best uplink beam to be used by the UE for one or more uplink transmissions based at least in part on the measurements associated with the downlink and uplink reference signals. For example, in some aspects, the base station may determine a reference signal (either a downlink or an uplink reference signal) that is associated with a best measurement (e.g., a highest RSRP), and may select the corresponding beam used to receive or transmit the reference signal as the best uplink beam. Additionally, or alternatively, the base station may use other factors to determine the best uplink beam, such as a loading associated with one or more beams (e.g., selecting a beam associated with a next highest measurement in cases where the beam with the highest measurement has a high load). Furthermore, in cases where the base station configures one or more overlapping downlink and uplink reference signals, the delta between the L1 measurement(s) reported by the UE for the downlink reference signal(s) and the measurement(s) obtained by the base station for the uplink reference signal(s) may be used to calibrate all of the L1 measurements reported by the UE. In this way, the measurements associated with the overlapping reference signals that are received and transmitted using the same spatial filter may account for a measurement uncertainty of the UE, imbalances or uncertainty in transmit power, and/or the like.

As further shown in FIG. 5, and by reference number 540, the base station may transmit, and the UE may receive, an uplink grant that schedules one or more uplink transmissions (e.g., a PUSCH, a PUCCH, and/or the like). Furthermore, the uplink grant may indicate the best uplink beam selected by the base station such that the UE is to use the best uplink beam to perform the uplink transmission. For example, as described above, the base station may select the best uplink beam from the set of candidate downlink beams used to receive the downlink reference signals and the set of candidate uplink beams used to transmit the uplink reference signals. For example, the base station may select the best uplink beam based at least in part on the downlink reference signal measurements provided by the UE in the L1 measurement report, the uplink reference signal measurements obtained by the base station, a calibration result based on a delta between a downlink reference signal measurement and an uplink reference signal measurement associated with the same beam or spatial filter, and/or the like. Furthermore, as described herein, the base station may indicate the best uplink beam to the UE according to an SRI index (e.g., using an SRI field in a DCI message that includes the uplink grant). Accordingly, the UE may use the SRI index to identify the best uplink beam based at least in part on the SRI indexing information that maps SRI indexes to candidate downlink beams and candidate uplink beams.

As further shown in FIG. 5, and by reference number 545, the UE may perform one or more uplink transmissions (e.g., a PUSCH, a PUCCH, and/or the like) using the uplink grant from the base station and the uplink beam mapped to the SRI index contained in the uplink grant. For example, as shown in FIG. 5, the uplink grant may include an SRI index that is mapped to a downlink beam used to receive a downlink reference signal. Accordingly, the UE may perform the one or more uplink transmissions using the same spatial filter as the downlink beam mapped to the SRI index or using a different spatial filter that has a configured mapping to the spatial filter associated with the downlink beam mapped to the SRI index. For example, in the latter case, the mapping between the spatial filter associated with a downlink beam and the spatial filter associated with the corresponding uplink beam may be configured by the base station, defined in a wireless communication standard or specification, and/or the like. Alternatively, in cases where the uplink grant indicates the best uplink beam according to an SRI index that is mapped to a candidate uplink beam used to transmit an uplink reference signal, the UE may perform the uplink transmission(s) using the same spatial filter as the uplink beam mapped to the SRI index.

As indicated above, FIG. 5 is provided as an example. Other examples may differ from what is described with regard to FIG. 5.

Figure 6:
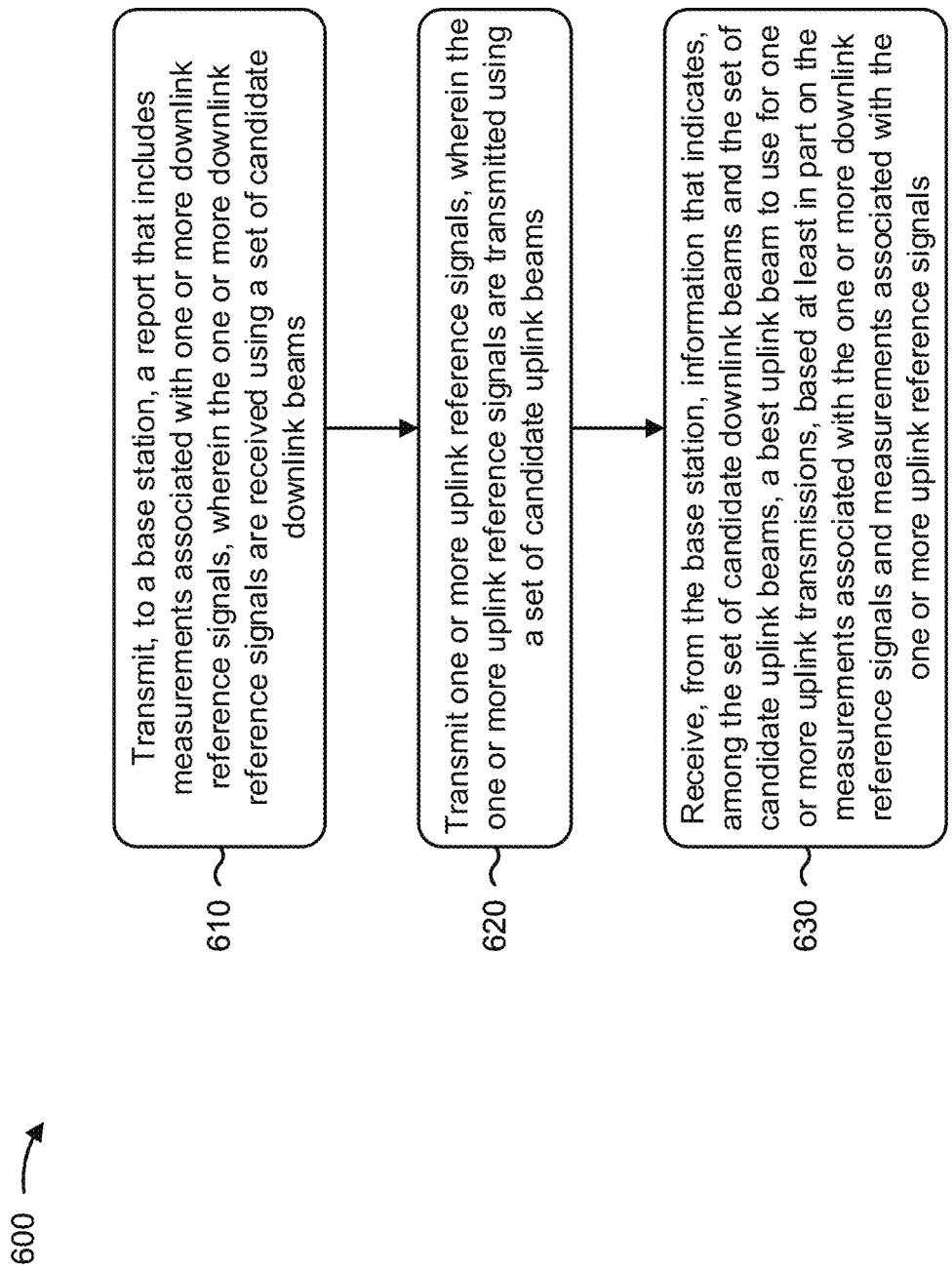
FIGS. 6-7 are diagrams illustrating example processes associated with uplink beam management using mixed downlink and uplink reference signals, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with uplink beam management using mixed downlink and uplink reference signals.

As shown in FIG. 6, in some aspects, process 600 may include transmitting, to a base station, a report that includes measurements associated with one or more downlink reference signals, wherein the one or more downlink reference signals are received using a set of candidate downlink beams (block 610). For example, the UE may transmit (e.g., using antenna 252, transmit processor 264, TX MIMO processor 266, modulator 254, controller/processor 280, and/or memory 282), to a base station, a report that includes measurements associated with one or more downlink reference signals, as described above. In some aspects, the one or more downlink reference signals are received using a set of candidate downlink beams.

As further shown in FIG. 6, in some aspects, process 600 may include transmitting one or more uplink reference signals, wherein the one or more uplink reference signals are transmitted using a set of candidate uplink beams (block 620). For example, the UE may transmit (e.g., using antenna 252, transmit processor 264, TX MIMO processor 266, modulator 254, controller/processor 280, and/or memory 282) one or more uplink reference signals, as described above. In some aspects, the one or more uplink reference signals are transmitted using a set of candidate uplink beams.

As further shown in FIG. 6, in some aspects, process 600 may include receiving, from the base station, information that indicates, among the set of candidate downlink beams and the set of candidate uplink beams, a best uplink beam to use for one or more uplink transmissions, based at least in part on the measurements associated with the one or more downlink reference signals and measurements associated with the one or more uplink reference signals (block 630). For example, the UE may receive (e.g., using antenna 252, demodulator 254, MIMO detector 256, receive processor 258, controller/processor 280, and/or memory 282), from the base station, information that indicates, among the set of candidate downlink beams and the set of candidate uplink beams, a best uplink beam to use for one or more uplink transmissions, based at least in part on the measurements associated with the one or more downlink reference signals and measurements associated with the one or more uplink reference signals, as described above.

Process 600 may include additional aspects, such as any single aspect or any combination of aspects described below and/or in connection with one or more other processes described elsewhere herein.

In a first aspect, the one or more downlink reference signals include one or more of an SSB, a CSI-RS, or a downlink DMRS, and the one or more uplink reference signals include one or more of an SRS or an uplink DMRS.

In a second aspect, alone or in combination with the first aspect, the one or more downlink reference signals and the one or more uplink reference signals used to select the best uplink beam are within a time window prior to or after a downlink message received from the base station or an uplink message transmitted by the UE.

In a third aspect, alone or in combination with one or more of the first and second aspects, one or more of resources or configuration information associated with the one or more downlink reference signals and the one or more uplink reference signals used to select the best uplink beam are indicated in a downlink message received from the base station.

In a fourth aspect, alone or in combination with one or more of the first through third aspects, at least one beam included in the set of candidate downlink beams is also included in the set of candidate uplink beams.

In a fifth aspect, alone or in combination with one or more of the first through fourth aspects, process 600 includes receiving, from the base station, indicator indexing information that indicates a mapping among a set of indicators, the set of candidate downlink beams used to receive the one or more downlink reference signals, and the set of candidate uplink beams used to transmit the one or more uplink reference signals.

In a sixth aspect, in combination with the fifth aspect, process 600 includes identifying the best uplink beam indicated by the base station based at least in part on an indicator used to indicate the best uplink beam and the indicator indexing information, and setting an uplink spatial filter for the one or more uplink transmissions based at least in part on the best uplink beam mapped to the indicator.

In a seventh aspect, in combination with the sixth aspect, the uplink spatial filter for the one or more uplink transmissions is a spatial filter used to transmit or receive an uplink or downlink reference signal that corresponds to the best uplink beam mapped to the indicator.

In an eighth aspect, in combination with the sixth aspect, the uplink spatial filter for the one or more uplink transmissions differs from a spatial filter used to transmit or receive a downlink reference signal that corresponds to the best uplink beam mapped to the indicator based at least in part on a spatial filter mapping.

In a ninth aspect, in combination with one or more of the sixth through eighth aspects, the indicator is an SRI.

In a tenth aspect, alone or in combination with one or more of the first through ninth aspects, process 600 includes receiving a single downlink control information (DCI) message to configure reception of the one or more downlink reference signals and transmission of the one or more uplink reference signals.

In an eleventh aspect, in combination with the tenth aspect, the single DCI message further configures one or more of a switching gap between the reception of the one or more downlink reference signals and the transmission of the one or more uplink reference signals, or settings associated with the report that includes the measurements associated with the one or more downlink reference signals.

In a twelfth aspect, alone or in combination with one or more of the first through eleventh aspects, the one or more downlink reference signals and the one or more uplink reference signals are associated with a common TRP, different TRPs that have a common PCI, or different TRPs that have different PCIs.

In a thirteenth aspect, alone or in combination with one or more of the first through twelfth aspects, the one or more downlink reference signals and the one or more uplink reference signals are associated with different component carriers.

In a fourteenth aspect, alone or in combination with one or more of the first through thirteenth aspects, the one or more downlink reference signals and the one or more uplink reference signals are associated with a switching time that is based at least in part on one or more downlink or uplink DMRSs.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
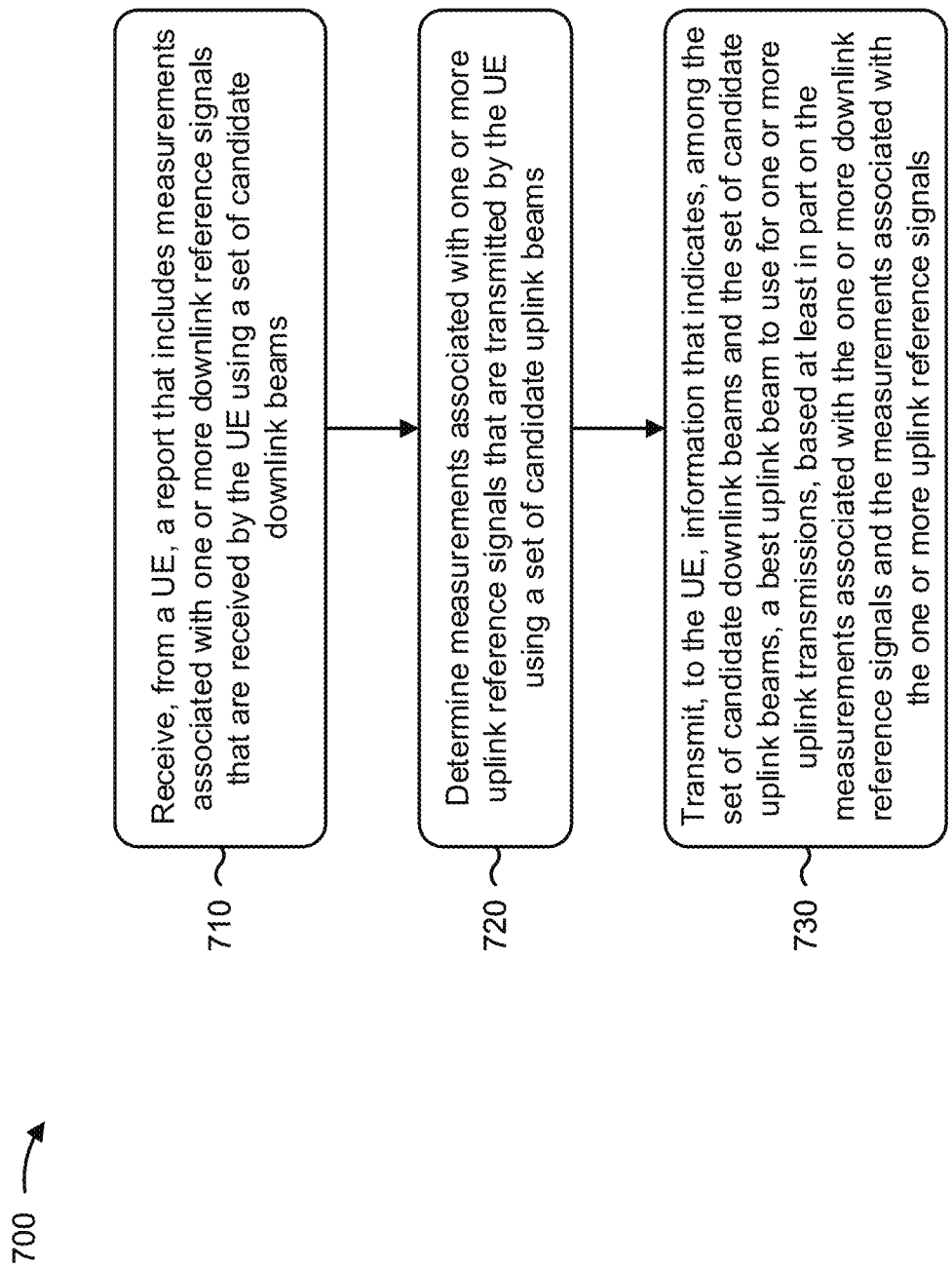

FIG. 7 is a diagram illustrating an example process 700 performed, for example, by a base station, in accordance with the present disclosure. Example process 700 is an example where the base station (e.g., base station 110 and/or the like) performs operations associated with uplink beam management using mixed downlink and uplink reference signals.

As shown in FIG. 7, in some aspects, process 700 may include receiving, from a UE, a report that includes measurements associated with one or more downlink reference signals that are received by the UE using a set of candidate downlink beams (block 710). For example, the base station may receive (e.g., using antenna 234, demodulator 232, MIMO detector 236, receive processor 238, controller/processor 240, and/or memory 242), from a UE, a report that includes measurements associated with one or more downlink reference signals that are received by the UE using a set of candidate downlink beams, as described above.

As further shown in FIG. 7, in some aspects, process 700 may include determining measurements associated with one or more uplink reference signals that are transmitted by the UE using a set of candidate uplink beams (block 720). For example, the base station may determine (e.g., using controller/processor 240, memory 242, and/or the like) measurements associated with one or more uplink reference signals that are transmitted by the UE using a set of candidate uplink beams, as described above.

As further shown in FIG. 7, in some aspects, process 700 may include transmitting, to the UE, information that indicates, among the set of candidate downlink beams and the set of candidate uplink beams, a best uplink beam to use for one or more uplink transmissions, based at least in part on the measurements associated with the one or more downlink reference signals and the measurements associated with the one or more uplink reference signals (block 730). For example, the base station may transmit (e.g., using transmit processor 220, TX MIMO processor 230, modulator 232, antenna 234, controller/processor 240, memory 242, and/or scheduler 246), to the UE, information that indicates, among the set of candidate downlink beams and the set of candidate uplink beams, a best uplink beam to use for one or more uplink transmissions, based at least in part on the measurements associated with the one or more downlink reference signals and the measurements associated with the one or more uplink reference signals, as described above.

Process 700 may include additional aspects, such as any single aspect or any combination of aspects described below and/or in connection with one or more other processes described elsewhere herein.

In a first aspect, the one or more downlink reference signals include one or more of an SSB, a CSI-RS, or a downlink DMRS, and the one or more uplink reference signals include one or more of an SRS or an uplink DMRS.

In a second aspect, alone or in combination with the first aspect, the one or more downlink reference signals and the one or more uplink reference signals used to select the best uplink beam are within a time window prior to or after a downlink message transmitted to the UE or an uplink message transmitted by the UE.

In a third aspect, alone or in combination with one or more of the first and second aspects, process 700 includes transmitting, to the UE, a downlink message indicating one or more of resources or configuration information associated with the one or more downlink reference signals and the one or more uplink reference signals used to select the best uplink beam.

In a fourth aspect, alone or in combination with one or more of the first through third aspects, at least one beam included in the set of candidate downlink beams is also included in the set of candidate uplink beams, and process 700 includes determining the best uplink beam based at least in part on a delta between a first measurement associated with a downlink reference signal received by the UE using the at least one beam and a second measurement associated with an uplink reference signal transmitted by the UE using the at least one beam.

In a fifth aspect, alone or in combination with one or more of the first through fourth aspects, process 700 includes transmitting, to the UE, indicator indexing information that indicates a mapping among a set of indicators, the set of candidate downlink beams used to receive the one or more downlink reference signals, and the set of candidate uplink beams used to transmit the one or more uplink reference signals.

In a sixth aspect, in combination with the fifth aspect, an uplink spatial filter for the one or more uplink transmissions is based at least in part on an indicator used to indicate the best uplink beam and the indicator indexing information.

In a seventh aspect, in combination with the sixth aspect, the uplink spatial filter for the one or more uplink transmissions is a spatial filter used by the UE to transmit or receive an uplink or downlink reference signal that corresponds to the best uplink beam mapped to the indicator.

In an eighth aspect, in combination with the sixth aspects, the uplink spatial filter for the one or more uplink transmissions differs from a spatial filter used by the UE to transmit or receive a downlink reference signal that corresponds to the best uplink beam mapped to the indicator based at least in part on a spatial filter mapping.

In a ninth aspect, in combination with one or more of the sixth through eighth aspects, the indicator is an SRI.

In a tenth aspect, alone or in combination with one or more of the first through ninth aspects, process 700 includes transmitting, to the UE, a single DCI message to configure reception of the one or more downlink reference signals by the UE and transmission of the one or more uplink reference signals by the UE.

In an eleventh aspect, in combination with the tenth aspect, the single DCI message further configures one or more of a switching gap between the reception of the one or more downlink reference signals by the UE and the transmission of the one or more uplink reference signals by the UE, or settings associated with the report received from the UE that includes the measurements associated with one or more downlink reference signals.

In a twelfth aspect, alone or in combination with one or more of the first through eleventh aspects, the one or more downlink reference signals and the one or more uplink reference signals are associated with a common TRP, different TRPs that have a common PCI, or different TRPs that have different PCIs.

In a thirteenth aspect, alone or in combination with one or more of the first through twelfth aspects, the one or more downlink reference signals and the one or more uplink reference signals are associated with different component carriers.

In a fourteenth aspect, alone or in combination with one or more of the first through thirteenth aspects, the one or more downlink reference signals and the one or more uplink reference signals are associated with a UE switching time that is based at least in part on one or more downlink or uplink DMRSs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a UE, comprising: transmitting, to a base station, a report that includes measurements associated with one or more downlink reference signals, wherein the one or more downlink reference signals are received using a set of candidate downlink beams; transmitting one or more uplink reference signals, wherein the one or more uplink reference signals are transmitted using a set of candidate uplink beams; and receiving, from the base station, information that indicates, among the set of candidate downlink beams and the set of candidate uplink beams, a best uplink beam to use for one or more uplink transmissions based at least in part on the measurements associated with the one or more downlink reference signals and measurements associated with the one or more uplink reference signals.

Aspect 2: The method of Aspect 1, wherein the one or more downlink reference signals include one or more of an SSB, a CSI-RS, or a downlink DMRS, and wherein the one or more uplink reference signals include one or more of an SRS or an uplink DMRS.

Aspect 3: The method of any one of Aspects 1-2, wherein the one or more downlink reference signals and the one or more uplink reference signals used to select the best uplink beam are within a time window prior to or after a downlink message received from the base station or an uplink message transmitted by the UE.

Aspect 4: The method of any one of Aspects 1-3, wherein one or more of resources or configuration information associated with the one or more downlink reference signals and the one or more uplink reference signals used to select the best uplink beam are indicated in a downlink message received from the base station.

Aspect 5: The method of any one of Aspects 1-4, wherein at least one beam included in the set of candidate downlink beams is also included in the set of candidate uplink beams.

Aspect 6: The method of any one of Aspects 1-5, further comprising: receiving, from the base station, indicator indexing information that indicates a mapping among a set of indicators, the set of candidate downlink beams used to receive the one or more downlink reference signals, and the set of candidate uplink beams used to transmit the one or more uplink reference signals.

Aspect 7: The method of Aspect 6, further comprising: identifying the best uplink beam indicated by the base station based at least in part on an indicator used to indicate the best uplink beam and the indicator indexing information; and setting an uplink spatial filter for the one or more uplink transmissions based at least in part on the best uplink beam mapped to the indicator.

Aspect 8: The method of Aspect 7, wherein the uplink spatial filter for the one or more uplink transmissions is a spatial filter used to transmit or receive an uplink or downlink reference signal that corresponds to the best uplink beam mapped to the indicator.

Aspect 9: The method of Aspect 7, wherein the uplink spatial filter for the one or more uplink transmissions differs from a spatial filter used to transmit or receive a downlink reference signal that corresponds to the best uplink beam mapped to the indicator based at least in part on a spatial filter mapping.

Aspect 10: The method of any one of Aspects 7-9, wherein the indicator is an SRI.

Aspect 11: The method of any one of Aspects 1-10, further comprising: receiving a single DCI message to configure reception of the one or more downlink reference signals and transmission of the one or more uplink reference signals.

Aspect 12: The method of Aspect 11, wherein the single DCI message further configures one or more of a switching gap between the reception of the one or more downlink reference signals and the transmission of the one or more uplink reference signals, or settings associated with the report that includes the measurements associated with the one or more downlink reference signals.

Aspect 13: The method of any one of Aspects 1-12, wherein the one or more downlink reference signals and the one or more uplink reference signals are associated with a common TRP, different TRPs that have a common PCI, or different TRPs that have different PCIs.

Aspect 14: The method of any one of Aspects 1-13, wherein the one or more downlink reference signals and the one or more uplink reference signals are associated with different component carriers.

Aspect 15: The method of any one of Aspects 1-14, wherein the one or more downlink reference signals and the one or more uplink reference signals are associated with a switching time that is based at least in part on one or more downlink or uplink DMRSs.

Aspect 16: A method of wireless communication performed by a base station, comprising: receiving, from a UE, a report that includes measurements associated with one or more downlink reference signals that are received by the UE using a set of candidate downlink beams; determining measurements associated with one or more uplink reference signals that are transmitted by the UE using a set of candidate uplink beams; and transmitting, to the UE, information that indicates, among the set of candidate downlink beams and the set of candidate uplink beams, a best uplink beam to use for one or more uplink transmissions based at least in part on the measurements associated with the one or more downlink reference signals and the measurements associated with the one or more uplink reference signals.

Aspect 17: The method of Aspect 16, wherein the one or more downlink reference signals include one or more of an SSB, a CSI-RS, or a downlink DMRS, and wherein the one or more uplink reference signals include one or more of an SRS or an uplink DMRS.

Aspect 18: The method of any one of Aspects 16-17, wherein the one or more downlink reference signals and the one or more uplink reference signals used to select the best uplink beam are within a time window prior to or after a downlink message transmitted to the UE or an uplink message transmitted by the UE.

Aspect 19: The method of any one of Aspects 16-18, further comprising: transmitting, to the UE, a downlink message indicating one or more of resources or configuration information associated with the one or more downlink reference signals and the one or more uplink reference signals used to select the best uplink beam.

Aspect 20: The method of any one of Aspects 16-19, wherein at least one beam included in the set of candidate downlink beams is also included in the set of candidate uplink beams, and wherein the method further comprises: determining the best uplink beam based at least in part on a delta between a first measurement associated with a downlink reference signal received by the UE using the at least one beam and a second measurement associated with an uplink reference signal transmitted by the UE using the at least one beam.

Aspect 21: The method of any one of Aspects 16-20, further comprising: transmitting, to the UE, indicator indexing information that indicates a mapping among a set of indicators, the set of candidate downlink beams used to receive the one or more downlink reference signals, and the set of candidate uplink beams used to transmit the one or more uplink reference signals.

Aspect 22: The method of Aspect 21, wherein an uplink spatial filter for the one or more uplink transmissions is based at least in part on an indicator used to indicate the best uplink beam and the indicator indexing information.

Aspect 23: The method of Aspect 22, wherein the uplink spatial filter for the one or more uplink transmissions is a spatial filter used by the UE to transmit or receive an uplink or downlink reference signal that corresponds to the best uplink beam mapped to the indicator.

Aspect 24: The method of Aspect 22, wherein the uplink spatial filter for the one or more uplink transmissions differs from a spatial filter used by the UE to transmit or receive a downlink reference signal that corresponds to the best uplink beam mapped to the indicator based at least in part on a spatial filter mapping.

Aspect 25: The method of any one of Aspects 22-24, wherein the indicator is an SRI.

Aspect 26: The method of any one of Aspects 16-25, further comprising: transmitting, to the UE, a single DCI message to configure reception of the one or more downlink reference signals by the UE and transmission of the one or more uplink reference signals by the UE.

Aspect 27: The method of Aspect 26, wherein the single DCI message further configures one or more of a switching gap between the reception of the one or more downlink reference signals by the UE and the transmission of the one or more uplink reference signals by the UE, or settings associated with the report received from the UE that includes the measurements associated with the one or more downlink reference signals.

Aspect 28: The method of any one of Aspects 16-27, wherein the one or more downlink reference signals and the one or more uplink reference signals are associated with a common TRP, different TRPs that have a common PCI, or different TRPs that have different PCIs.

Aspect 29: The method of any one of Aspects 16-28, wherein the one or more downlink reference signals and the one or more uplink reference signals are associated with different component carriers.

Aspect 30: The method of any one of Aspects 16-29, wherein the one or more downlink reference signals and the one or more uplink reference signals are associated with a UE switching time that is based at least in part on one or more downlink or uplink DMRSs.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a base station, a report that includes measurements associated with one or more downlink reference signals, wherein the one or more downlink reference signals are received using a set of candidate downlink beams;
   transmitting one or more uplink reference signals, wherein the one or more uplink reference signals are transmitted using a set of candidate uplink beams;
   receiving, from the base station, indicator indexing information that indicates a mapping among a set of indicators, the set of candidate downlink beams used to receive the one or more downlink reference signals, and the set of candidate uplink beams used to transmit the one or more uplink reference signals; and
   receiving, from the base station, information that indicates, among the set of candidate downlink beams and the set of candidate uplink beams, a best uplink beam to use for one or more uplink transmissions based at least in part on the measurements associated with the one or more downlink reference signals and measurements associated with the one or more uplink reference signals.

2. The method of claim 1, wherein the one or more downlink reference signals and the one or more uplink reference signals used to select the best uplink beam are within a time window prior to or after a downlink message received from the base station or an uplink message transmitted by the UE.

3. The method of claim 1, wherein one or more of resources or configuration information associated with the one or more downlink reference signals and the one or more uplink reference signals used to select the best uplink beam are indicated in a downlink message received from the base station.

4. The method of claim 1, wherein at least one beam included in the set of candidate downlink beams is also included in the set of candidate uplink beams.

5. The method of claim 1, further comprising:
   identifying the best uplink beam indicated by the base station based at least in part on an indicator used to indicate the best uplink beam and the indicator indexing information; and
   setting an uplink spatial filter for the one or more uplink transmissions based at least in part on the best uplink beam mapped to the indicator.

6. The method of claim 1, further comprising:
   receiving a single downlink control information (DCI) message to configure reception of the one or more downlink reference signals and transmission of the one or more uplink reference signals, wherein the single DCI message further configures one or more of a switching gap between the reception of the one or more downlink reference signals and the transmission of the one or more uplink reference signals, or settings associated with the report that includes the measurements associated with the one or more downlink reference signals.

7. The method of claim 1, wherein the one or more downlink reference signals and the one or more uplink reference signals are associated with one or more of a common transmit receive point (TRP), different TRPs that have a common physical cell identity (PCI), different TRPs that have different PCIs, different component carriers, or a switching time that is based at least in part on one or more downlink or uplink demodulation reference signals.

8. A method of wireless communication performed by a base station, comprising:
   receiving, from a user equipment (UE), a report that includes measurements associated with one or more downlink reference signals that are received by the UE using a set of candidate downlink beams;
   determining measurements associated with one or more uplink reference signals that are transmitted by the UE using a set of candidate uplink beams;
   transmitting, to the UE, indicator indexing information that indicates a mapping among a set of indicators, the set of candidate downlink beams used to receive the one or more downlink reference signals, and the set of candidate uplink beams used to transmit the one or more uplink reference signals; and
   transmitting, to the UE, information that indicates, among the set of candidate downlink beams and the set of candidate uplink beams, a best uplink beam to use for one or more uplink transmissions based at least in part on the measurements associated with the one or more downlink reference signals and the measurements associated with the one or more uplink reference signals.

9. The method of claim 8, wherein the one or more downlink reference signals and the one or more uplink reference signals used to select the best uplink beam are within a time window prior to or after a downlink message transmitted to the UE or an uplink message transmitted by the UE.

10. The method of claim 8, further comprising:
    transmitting, to the UE, a downlink message indicating one or more of resources or configuration information associated with the one or more downlink reference signals and the one or more uplink reference signals used to select the best uplink beam.

11. The method of claim 8, wherein at least one beam included in the set of candidate downlink beams is also included in the set of candidate uplink beams, and wherein the method further comprises:
    determining the best uplink beam based at least in part on a delta between a first measurement associated with a downlink reference signal received by the UE using the at least one beam and a second measurement associated with an uplink reference signal transmitted by the UE using the at least one beam.

12. The method of claim 8, wherein an uplink spatial filter for the one or more uplink transmissions is based at least in part on an indicator used to indicate the best uplink beam and the indicator indexing information.

13. The method of claim 8, further comprising:
    transmitting, to the UE, a single downlink control information (DCI) message to configure reception of the one or more downlink reference signals by the UE and transmission of the one or more uplink reference signals by the UE, wherein the single DCI message further configures one or more of a switching gap between the reception of the one or more downlink reference signals and the transmission of the one or more uplink reference signals, or settings associated with the report that includes the measurements associated with the one or more downlink reference signals.

14. The method of claim 8, wherein the one or more downlink reference signals and the one or more uplink reference signals are associated with a common transmit receive point (TRP), different TRPs that have a common physical cell identity (PCI), or different TRPs that have different PCIs, different component carriers, or a switching time that is based at least in part on one or more downlink or uplink demodulation reference signals.

15. A user equipment (UE) for wireless communication, comprising:
a memory; and
one or more processors coupled to the memory, the memory and the one or more processors configured to:
transmit, to a base station, a report that includes measurements associated with one or more downlink reference signals, wherein the one or more downlink reference signals are received using a set of candidate downlink beams;
transmit one or more uplink reference signals, wherein the one or more uplink reference signals are transmitted using a set of candidate uplink beams;
receive, from the base station, indicator indexing information that indicates a mapping among a set of indicators, the set of candidate downlink beams used to receive the one or more downlink reference signals, and the set of candidate uplink beams used to transmit the one or more uplink reference signals; and
receive, from the base station, information that indicates, among the set of candidate downlink beams and the set of candidate uplink beams, a best uplink beam to use for one or more uplink transmissions based at least in part on the measurements associated with the one or more downlink reference signals and measurements associated with the one or more uplink reference signals.

16. The UE of claim 15, wherein the one or more downlink reference signals and the one or more uplink reference signals used to select the best uplink beam are within a time window prior to or after a downlink message received from the base station or an uplink message transmitted by the UE.

17. The UE of claim 15, wherein one or more of resources or configuration information associated with the one or more downlink reference signals and the one or more uplink reference signals used to select the best uplink beam are indicated in a downlink message received from the base station.

18. The UE of claim 15, wherein at least one beam included in the set of candidate downlink beams is also included in the set of candidate uplink beams.

19. The UE of claim 15, wherein the memory and the one or more processors are further configured to:
identify the best uplink beam indicated by the base station based at least in part on an indicator used to indicate the best uplink beam and the indicator indexing information; and
set an uplink spatial filter for the one or more uplink transmissions based at least in part on the best uplink beam mapped to the indicator.

20. The UE of claim 15, wherein the memory and the one or more processors are further configured to:
receive a single downlink control information (DCI) message to configure reception of the one or more downlink reference signals and transmission of the one or more uplink reference signals, wherein the single DCI message further configures one or more of a switching gap between the reception of the one or more downlink reference signals and the transmission of the one or more uplink reference signals, or settings associated with the report that includes the measurements associated with the one or more downlink reference signals.

21. A base station for wireless communication, comprising:
a memory; and
one or more processors coupled to the memory, the memory and the one or more processors configured to:
receive, from a user equipment (UE), a report that includes measurements associated with one or more downlink reference signals that are received by the UE using a set of candidate downlink beams;
determine measurements associated with one or more uplink reference signals that are transmitted by the UE using a set of candidate uplink beams;
transmit, to the UE, indicator indexing information that indicates a mapping among a set of indicators, the set of candidate downlink beams used to receive the one or more downlink reference signals, and the set of candidate uplink beams used to transmit the one or more uplink reference signals; and
transmit, to the UE, information that indicates, among the set of candidate downlink beams and the set of candidate uplink beams, a best uplink beam to use for one or more uplink transmissions based at least in part on the measurements associated with the one or more downlink reference signals and the measurements associated with the one or more uplink reference signals.

22. The base station of claim 21, wherein the one or more downlink reference signals and the one or more uplink reference signals used to select the best uplink beam are within a time window prior to or after a downlink message transmitted to the UE or an uplink message transmitted by the UE.

23. The base station of claim 21, wherein the memory and the one or more processors are further configured to:
transmit, to the UE, a downlink message indicating one or more of resources or configuration information associated with the one or more downlink reference signals and the one or more uplink reference signals used to select the best uplink beam.

24. The base station of claim 21, wherein at least one beam included in the set of candidate downlink beams is also included in the set of candidate uplink beams, and wherein the memory and the one or more processors are further configured to:
determine the best uplink beam based at least in part on a delta between a first measurement associated with a downlink reference signal received by the UE using the at least one beam and a second measurement associated with an uplink reference signal transmitted by the UE using the at least one beam.

25. The base station of claim 21, wherein an uplink spatial filter for the one or more uplink transmissions is based at least in part on an indicator used to indicate the best uplink beam and the indicator indexing information.

26. The base station of claim 21, wherein the memory and the one or more processors are further configured to:

transmit, to the UE, a single downlink control information (DCI) message to configure reception of the one or more downlink reference signals by the UE and transmission of the one or more uplink reference signals by the UE, wherein the single DCI message further configures one or more of a switching gap between the reception of the one or more downlink reference signals and the transmission of the one or more uplink reference signals, or settings associated with the report that includes the measurements associated with the one or more downlink reference signals.

\* \* \* \* \*